No. 607,247. Patented July 12, 1898.
W. S. JOHNSON & H. WINKENWERDER.
ELECTRIC MOTOR.
(Application filed Nov. 9, 1896. Renewed June 4, 1898.)

(No Model.) 3 Sheets—Sheet 1.

Witnesses:
Inventors:

No. 607,247. Patented July 12, 1898.
W. S. JOHNSON & H. WINKENWERDER.
ELECTRIC MOTOR.
(Application filed Nov. 9, 1896. Renewed June 4, 1898.)
(No Model.) 3 Sheets—Sheet 2.

Witnesses:
Geo. W. Young,
Chas. L. Goss.

Inventors:
Warren S. Johnson
Henry Winkenwerder
By Whipple, Flanders, Smith, Bottum & Vilas
Attorneys.

No. 607,247. Patented July 12, 1898.
W. S. JOHNSON & H. WINKENWERDER.
ELECTRIC MOTOR.
(Application filed Nov. 9, 1896. Renewed June 4, 1898.)
(No Model.) 3 Sheets—Sheet 3.

Witnesses:
Geo. W. Young,
Chas. L. Goss.

Inventors:
Warren S. Johnson
Henry Winkenwerder
By Winkler Bowles Smith Bottum & Vilas
Attorneys.

United States Patent Office.

WARREN S. JOHNSON AND HENRY WINKENWERDER, OF MILWAUKEE, WISCONSIN, ASSIGNORS TO THE JOHNSON ELECTRIC SERVICE COMPANY, OF SAME PLACE.

ELECTRIC MOTOR.

SPECIFICATION forming part of Letters Patent No. 607,247, dated July 12, 1898.

Application filed November 9, 1896. Renewed June 4, 1898. Serial No. 682,617. (No model.)

*To all whom it may concern:*

Be it known that we, WARREN S. JOHNSON and HENRY WINKENWERDER, of Milwaukee, in the county of Milwaukee and State of Wisconsin, have invented certain new and useful Improvements in Electric Motors; and we do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of our invention is to provide a simple compact motor for various kinds of intermittent or light work that can be practically and economically operated with a few cells of battery.

It consists of certain novel features in the construction and arrangement of component parts of the motor, as hereinafter particularly described, and pointed out in the claims.

In the accompanying drawings like letters designate the same parts in the several figures.

Figure 2:
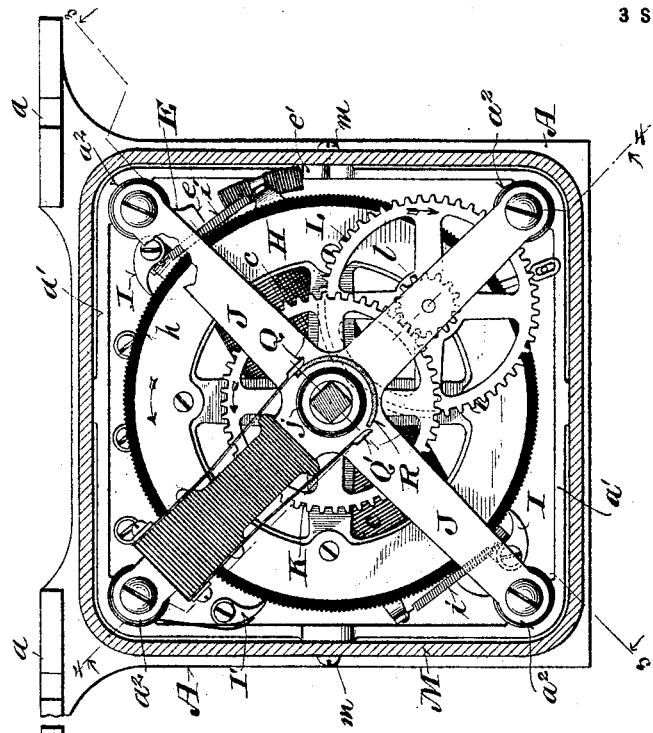
Figure 1:
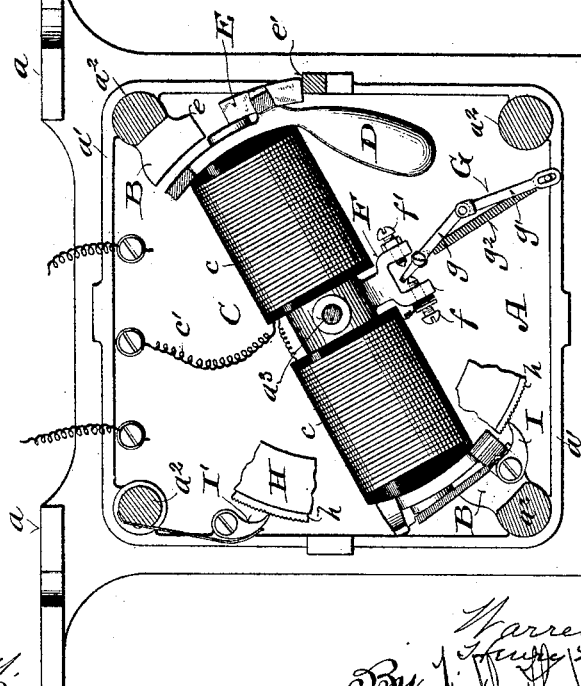
Figure 4:
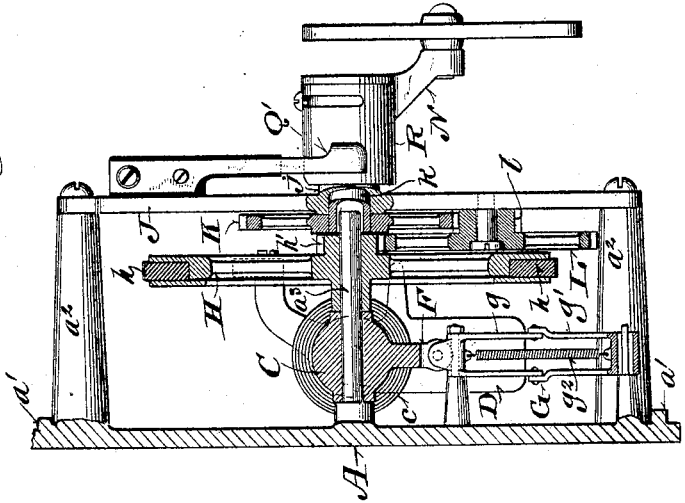
Figure 3:
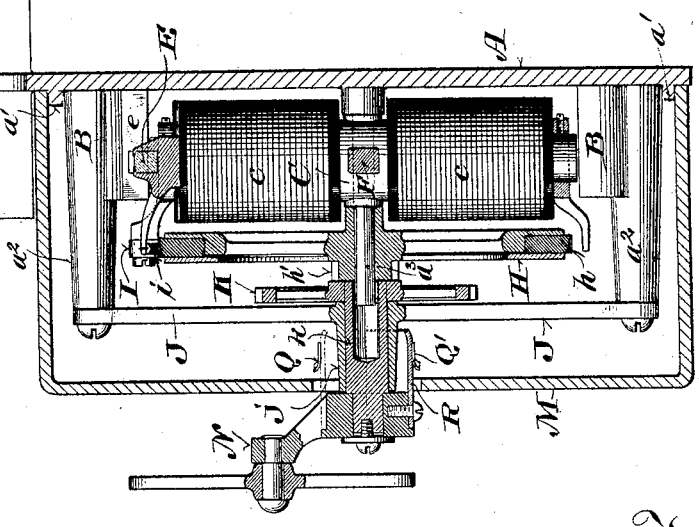
Figure 5:
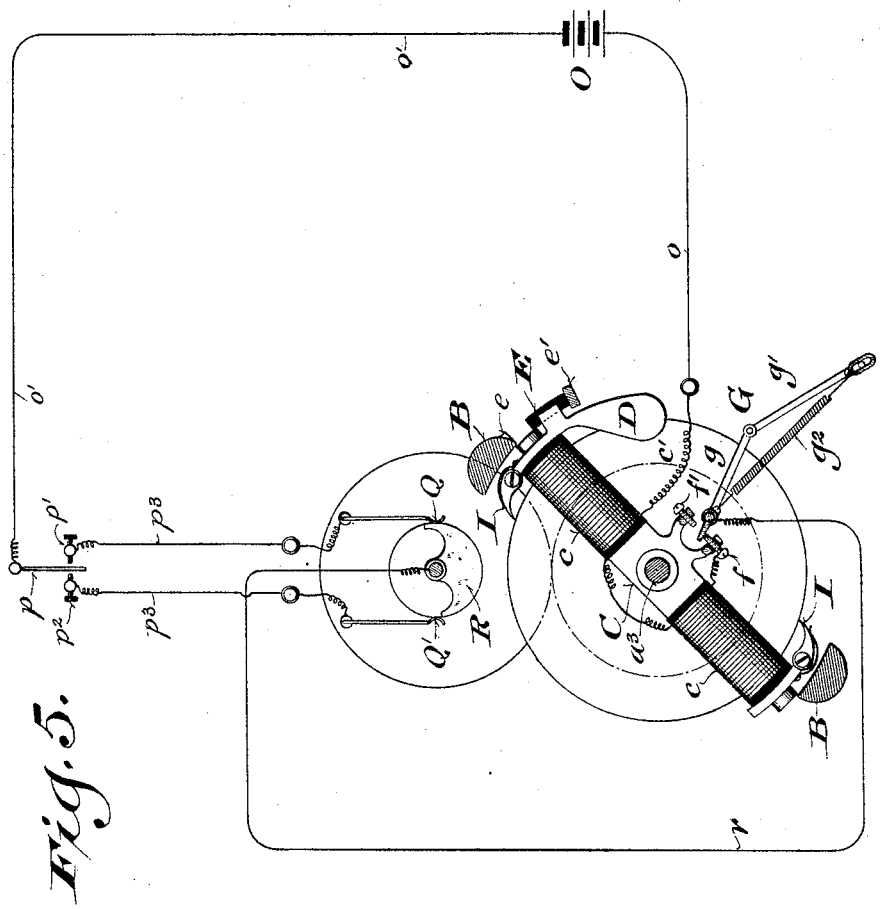

Figure 1 is a front elevation of a portion of a motor embodying our improvements, the cover, gearing, and certain other parts of the device being broken away and removed. Fig. 2 is a similar view of the motor complete, the cover being shown in section. Fig. 3 is a section on the line 3 3; and Fig. 4, a similar section on the line 4 4, Fig. 2; and Fig. 5 is a diagram of the motor and of one arrangement of an electric circuit and connections with which it may be employed.

For the purpose of illustration we have shown a motor designed primarily for use in heat-regulating apparatus for operating the damper or dampers of a furnace or other heater; but we do not wish to be understood as limiting ourselves to this particular application of the motor, as it may be applied to various other uses with little or no change in its essential features.

Referring to Figs. 1 to 4, inclusive, of the drawings, A designates the base of the motor, which may be conveniently made of a cast-iron plate provided with flanges or plates $a\ a$ for its attachment to a wall, ceiling, or other support. It is formed in the present instance on one face with a flange $a'$, over which the cover fits, and with four posts $a^2\ a^2$. Two of these posts, which are located diagonally opposite each other, are formed or provided with enlargements B B, which serve as armature-poles of an oscillatory electromagnet and correspond with the field or pole pieces of an ordinary rotary electric motor. Midway between the poles B B of the armature the base A is formed or provided with a pin $a^3$, upon which the core of an electromagnet C is centrally mounted and adapted to turn, the ends of the core terminating so as to just clear the pole-pieces of the armature when the magnet is turned opposite them. In operative position the base-plate stands in a vertical position and the pivot-pin $a^3$ of the magnet projects horizontally therefrom.

$c\ c$ are the coils of the magnet, which are wound around its core on opposite sides of the pivot-pin on which it oscillates. These coils are connected with each other and at one end are connected through a wire $c'$ with one pole of the electric generator. At the other end they are connected with a contact of a circuit-controller, as hereinafter explained. At one end the magnet is provided with a weight D, which tends to turn it in a direction opposite that in which it is moved by the magnetic attraction between its core and the pole-pieces of the armature when the magnet is energized. It is also provided at one end with an elastic stop E, which may be conveniently made of soft rubber projecting between two opposing abutments $e\ e'$ on the base or frame of the motor and adapted, by engagement with them, to limit the oscillatory movement of the magnet and to react thereon, thereby causing the momentum of its movement in either direction to be applied to its movement in the opposite direction. It is obvious that this elastic stop may be fixed and the abutments with which it engages applied to the movable part of the motor with the same effect. The arrangement of the magnet and armature may also be reversed, the armature being made the movable and the magnet the fixed part of the motor.

The stop and abutments are so arranged that when the movable part of the motor is carried by the weight to its extreme position in one direction, as shown in Fig. 1, the ends of the core of the magnet will be out of line with the pole-pieces of the armature, so that when the magnet is energized the lines of magnetic force between the ends of the magnet-core and the poles of the armature will lie transversely or obliquely to the axis of the magnet and the attractive energy of the magnet will tend to straighten and shorten these lines and make them parallel with the axis of the magnet. The stop and abutment $e$ are so arranged that the movement of the magnet produced by its attractive force when energized will be limited when the ends of its core are directly opposite the poles of the armature, or nearly so. It follows, therefore, that the magnet acts with its greatest energy at the beginning of its advance or forward movement, and the force with which it is propelled decreases until the ends of its core are opposite the poles of the armature, in which position its attractive energy would tend to hold it if the circuit were not broken through its coils. This characteristic of the motor is of advantage in its practical operation because the greatest force is required to overcome the inertia of the moving parts of the mechanism and its load in starting, and when once started their momentum is added to the magnetic pull.

F is a forked arm projecting laterally between the coils of the magnet from the hub of its core and provided with opposing screws $f\,f'$, threaded therein and adjustable toward and from each other. One of the screws $f$, serving as a contact of a circuit-controller, is suitably insulated from the arm F and is connected with the coils of the magnet C.

G is a toggle or knuckle joint, the link $g$ of which is pivoted to the base adjacent to the forked arm F and projects at one end between the points of the screws $f\,f'$, forming the other contact of the circuit-breaker last mentioned. The other arm $g'$ has a sliding pivot connection with the base, and the two links are connected by a spring $g^2$, which tends to throw and hold them in either direction away from a straight line connecting their fixed pivot-bearings. By means of a circuit-controller so constructed and arranged the circuit will be broken and closed at determinate points in the movement of the oscillatory part of the motor and will maintain a closed circuit through the coils of the magnet during the greater part of the advance movement of the oscillatory part of the motor effected by magnetic attraction.

Various forms of mechanism may be employed for transmitting the movement of the oscillatory part of the motor to the work to be performed, according to the nature of such work. We have shown for the purpose of translating the oscillatory movement of the magnet into a rotary movement a ratchet-wheel H, which may be conveniently mounted on the spindle $a^3$ that the magnet turns upon, and pawls I I, carried by the ends of the magnet and yieldingly held in engagement with the periphery of said ratchet-wheel by springs $i\,i$. A pawl I' holds said ratchet-wheel from turning backward. To avoid noise, jar, and wear by the action of the pawls on the ratchet-wheel, the latter is preferably formed or provided with an elastic non-sonorous notched or serrated rim $h$, which may be conveniently made of rubber, held in an annular groove or recess in the periphery of the wheel by a plate which is clamped thereto by screws. For the specific purpose for which the motor herein shown and described is designed it is furnished with a train of speed-reducing and power-multiplying gears, as shown most clearly in Figs. 2 and 4.

J designates a cross-shaped frame attached at its ends to the four corner-posts $a^2\,a^2$ of the base. It is formed at the center in the line of the spindle $a^3$ with a sleeve $j$, which serves as a bearing for the journal $k$ of a gear K. This gear meshes with a pinion $l$, concentrically formed with or attached to a gear L and mounted to turn on a stud projecting inwardly from one arm of the frame J, as shown in Fig. 4. The gear L in turn meshes with a pinion $h'$, concentrically formed with or attached to the ratchet-wheel H. The journal $k$ is bored out axially at its inner end to fit over the outer end of the spindle $a^3$, and thereby hold it and said gear concentric with the ratchet-wheel H and its pinion $h'$.

M is a box-shaped cover which fits over the flange $a'$ of the base and is detachably secured thereto by screws $m\,m$, as shown in Fig. 2. With the base it completely incases the mechanism of the motor with the exception of the outer end of the journal $k$, which projects through an opening in the cover and is provided outside thereof with a detachable crank-arm N. To this arm is attached in the usual way the chain or chains for operating one or more dampers of a furnace or other heater.

For operating a damper or register in the regulation of temperature the electric connections of the motor are arranged to turn the crank N a half-revolution at a time, whereby the damper or register is opened or closed, according to the temperature in the room in which the thermostat is located. The arrangement of the electric connections of the motor for this purpose is shown in Fig. 5, in which O designates the battery, $o$ the wire leading from one pole of the battery to the binding-post, which is directly connected with one end of the coils of magnet C, and $o'$ the wire leading from the other pole of the battery to the expansion-strip $p$ of the thermostat. The contacts $p'\,p^2$, between which the expansion-strip projects, are severally connected by wires $p^3\,p^3$ with insulated contact-springs Q Q', attached to the frame of the motor and projecting on opposite sides of the sleeve $j$ into the path of a segmental contact R, which is attached to the hub of the crank-arm N and projects therefrom inwardly through the opening in the cover M over the sleeve $j$. The contact R is electrically connected through the journal $k$ and the gearing and framework of the motor with the knuckle-joint G, this connection being indicated by the wire $r$ in Fig. 5.

Our improved motor, as herein shown and described, operates as follows for regulating temperature: Assuming that the parts of the motor are at rest in the positions in which they are shown in Figs. 1, 2, and 5 and that the expansion-strip $p$, having last engaged the contact $p^2$, is moved by a change of temperature into engagement with the other contact $p'$, the circuit being now closed from the battery O through wires $o$ and $c'$, the magnet-coils $c\ c$, contact $f$, contact $g$, the frame and gearing of the motor to the contact R, thence through the spring Q, wire $p^3$, contact $p'$, expansion-strip $p$, and wire $o'$ back to the battery, the magnet is energized and turned or swung to the left by the magnetic attraction between its core and the poles B B of the armature. The pawls I, acting on the ratchet-wheel H, turn it in the same direction, and through the gearing hereinbefore described the ratchet-wheel turns the crank N and the contact R at a slower rate of speed also in the same direction, as indicated by arrows on Fig. 2. The link $g$ of the knuckle-joint G is held by the spring $g^2$ in engagement with the screw $f$ during the advance movement of the magnet C until said link $g$ is carried slightly past a straight line with link $g'$ and the stop E is brought close to the abutment $e$. The circuit is thus kept closed and the magnet energized until it has completed or nearly completed its advance. As soon as the knuckle-joint passes a straight line the spring $g^2$ throws the link $g$ over into contact with the screw $f'$, which serves merely as a back-stop, and the circuit is thereby broken and the magnet is deënergized. With whatever force the abutment $e$ is struck by the stop E, depending upon the resistance to the movement of the magnet and its momentum, said stop is compressed and reacts to throw the magnet in the opposite direction, thereby aiding the weight D to return it to the starting-point. When the knuckle-joint is carried by the screw $f'$ in the opposite direction slightly past a straight line, as the stop E approaches the abutment $e'$ the link $g$ is thrown by the spring $g^2$ over again into engagement with the contact-screw $f$, thereby closing the circuit through the coils of magnet C, which is again swung forward, as above explained, by its magnetic force. The momentum with which the stop E on its return strikes the abutment $e'$ is imparted by the elasticity of said stop to the advance movement of the magnet in the opposite direction. The magnet is thus oscillated back and forth, turning the crank N forward intermittently, as above explained, until the contact R is turned out of engagement with the spring Q, breaking the circuit at that point. The crank N having been thus turned a half-revolution and the damper connected therewith shifted, the operation of the motor is arrested by the breaking of the circuit. The contact R now engages with the spring Q', and whenever the expansion-strip $p$ of the thermostat is moved by a change of temperature into engagement with the other contact $p^2$, which is connected with said spring Q, the circuit will be again closed through the coils of magnet C, the motor put in operation, and the crank N turned another half-revolution in the manner described, thereby shifting the damper to its opposite position.

It may be noted that the weight D and the supporting connections of the pawls I and springs $i$, which are attached to the core of the magnet, are made of non-magnetic metal or material, so as not to disperse the lines of magnetic force.

We do not wish to be understood as limiting ourselves to details of construction and arrangement shown and described for the purpose of explaining the nature and operation of our improvements, as they may be variously modified within the spirit and intended scope of our invention.

We claim—

1. In an electric motor, the combination of an electromagnet and armature, one of which is capable of oscillation transversely to the lines of magnetic force, a weight for moving said oscillatory part in one direction, an elastic stop for limiting the movement and reacting upon the oscillatory part, and a circuit-controller arranged to close the circuit at or near the limit of the return movement of the oscillatory part produced by the weight, and to break the circuit at or near the limit of its advance movement produced by the magnet, substantially as and for the purposes set forth.

2. In an electric motor, the combination of an electromagnet and armature, one of which is capable of a limited oscillatory movement transversely to the lines of magnetic force, a non-magnetic weight for moving the oscillatory part in one direction, the magnet being arranged to move it in the other, a non-magnetic elastic stop for limiting the movement and reacting upon the oscillatory part, a ratchet-wheel, and a pawl carried by the oscillatory part and adapted to engage with and turn said wheel, substantially as and for the purposes set forth.

3. In an electric motor the combination of an electromagnet and armature, one of which is capable of oscillation transversely to the lines of magnetic force passing through it, a ratchet-wheel having a rim of elastic, non-sonorous material, and a pawl carried by the oscillatory part and adapted to engage with said rim and turn said wheel, substantially as and for the purposes set forth.

4. In an electric motor, the combination of an electromagnet and armature, one of which is capable of oscillation, and a circuit-controller consisting of a knuckle-joint, a spring connecting the links of the joint and tending to turn and hold them in either direction out of line with each other and opposing points or projections between which the end of one of said links projects, one of said points and links constituting a part of an electric circuit through which said magnet is supplied with current, substantially as and for the purposes set forth.

5. In an electric motor, the combination of an electromagnet and armature, one of which is capable of oscillation, an elastic stop for limiting the movement of said oscillatory part, a weight for moving the oscillatory part in one direction, and a circuit-controller consisting of two opposing adjustable points or projections carried by the oscillatory part, a knuckle-joint, a spring tending to throw and hold the links of said joint in either direction out of line with each other, one of said links projecting between the opposing points or projections on the oscillatory part of the motor, substantially as and for the purposes set forth.

6. In an electric motor, the combination with an electric circuit, of an electromagnet and armature, one of which is capable of oscillation transversely to the lines of magnetic force and adapted to be turned in one direction by the electromagnetic energy of said magnet, a weight for moving said oscillatory part in the opposite direction, an elastic stop for limiting the movement of and reacting upon said oscillatory part, and a circuit-controller arranged to open and close the circuit through the winding of the magnet at or near the opposite limits respectively of the movement of said oscillatory part, substantially as and for the purposes set forth.

7. In an electric motor, the combination with an electric generator or source of current, and a thermostat having two contacts and an intermediate expansion-strip or movable part connected with one pole of said generator, of an electromagnet and armature, one of which is capable of a limited oscillatory movement transversely to the lines of magnetic force, the coil of the magnet being connected with the other pole of the generator, a circuit-controller adapted to open and close the circuit through the coils of said magnet at determinate points near the limits of the movement of said oscillatory part and comprising two contacts, one of which is connected with the coil of the magnet, a rotary segmental contact arranged to be turned by the motor and electrically connected with the other contact of said circuit-controller and two contacts arranged in the path of said rotary contact and connected respectively with the contacts of said thermostat, substantially as and for the purposes set forth.

8. In an electric motor, the combination with an electric circuit comprising a generator or source of current, and a thermostat, of an electromagnet and armature, one of which is capable of oscillation transversely to the lines of magnetic force, a circuit-controller adapted to open and close the circuit at or near the limits of the oscillatory part of the motor, a weight for moving the oscillatory part in one direction, an elastic stop for limiting the movement of and reacting upon the oscillatory part, a segmental contact adapted to be turned by the motor and two opposite contacts in the path of said rotary contact connected with opposing contacts of said thermostat, whereby the alternate closing of the circuit through opposite contacts will cause the motor to turn said rotary contact a determinate part of a revolution, substantially as and for the purposes set forth.

In testimony that we claim the foregoing as our own we affix our signatures in presence of two witnesses.

WARREN S. JOHNSON.
    HENRY WINKENWERDER.

Witnesses:
    A. H. CROSSMAN,
    ALFRED MORAWETZ.